A. DE VILBISS, Jr.
WEIGHING SCALE.
APPLICATION FILED NOV. 26, 1909.
1,028,552.
Patented June 4, 1912.
3 SHEETS—SHEET 3.
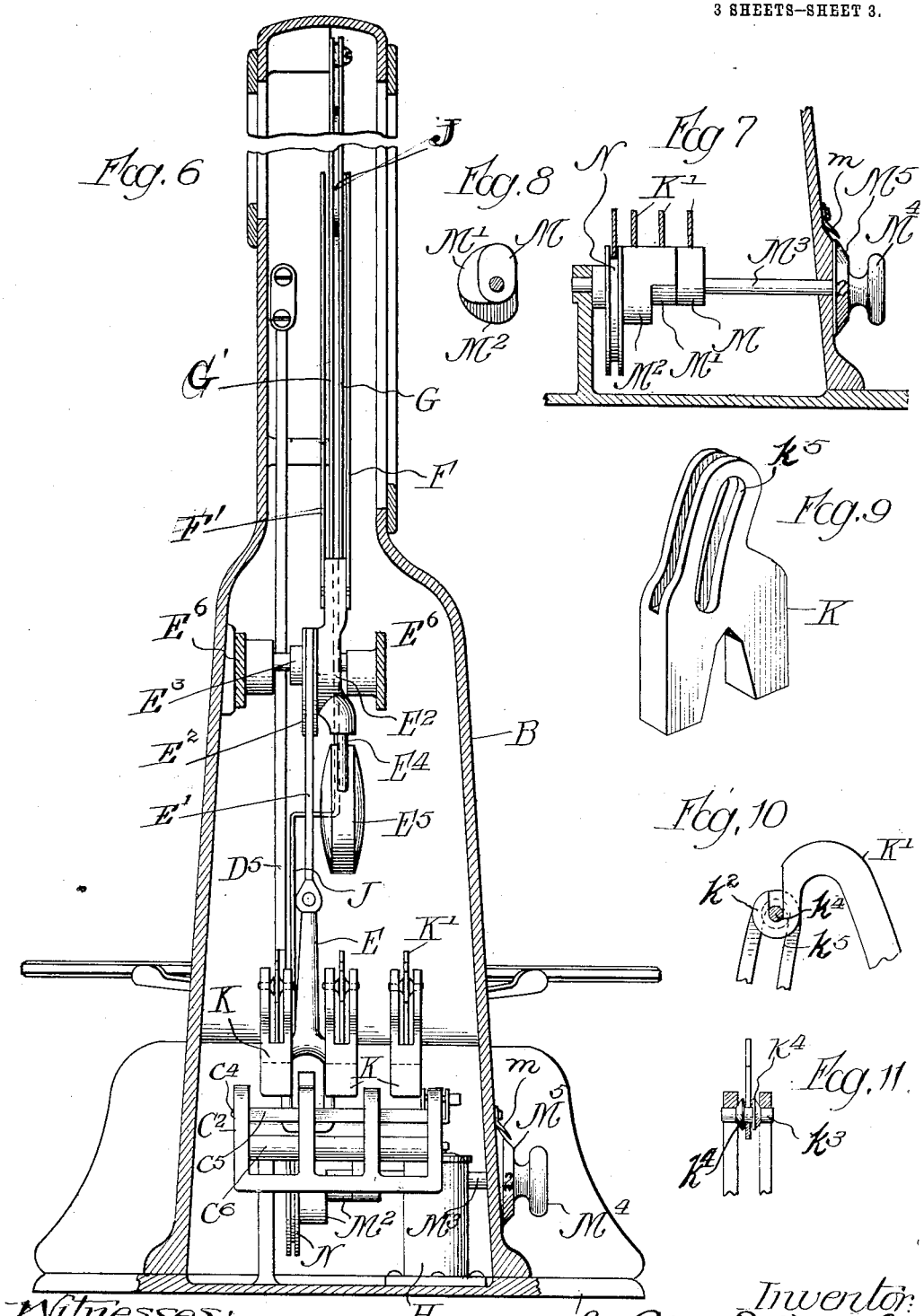

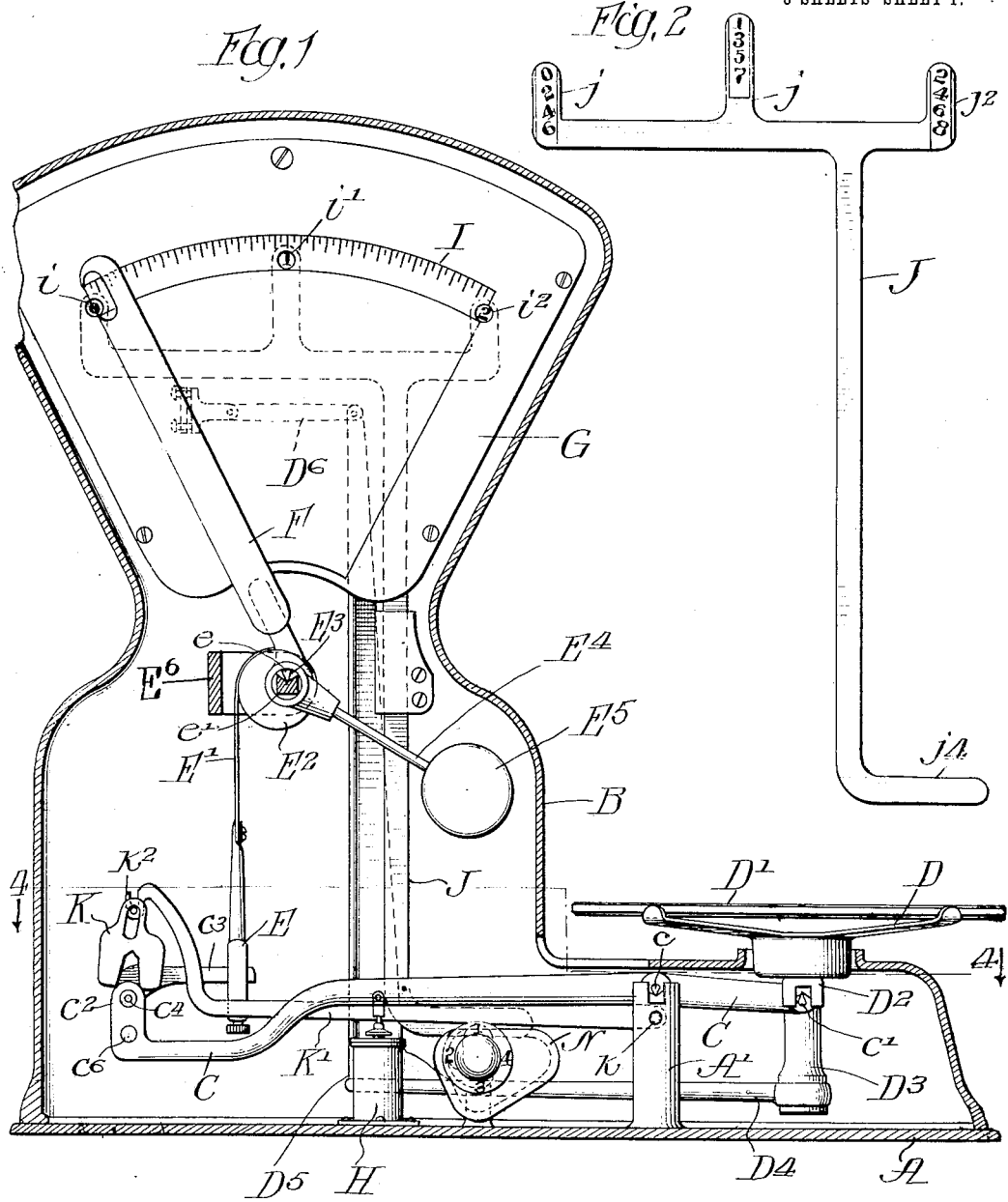

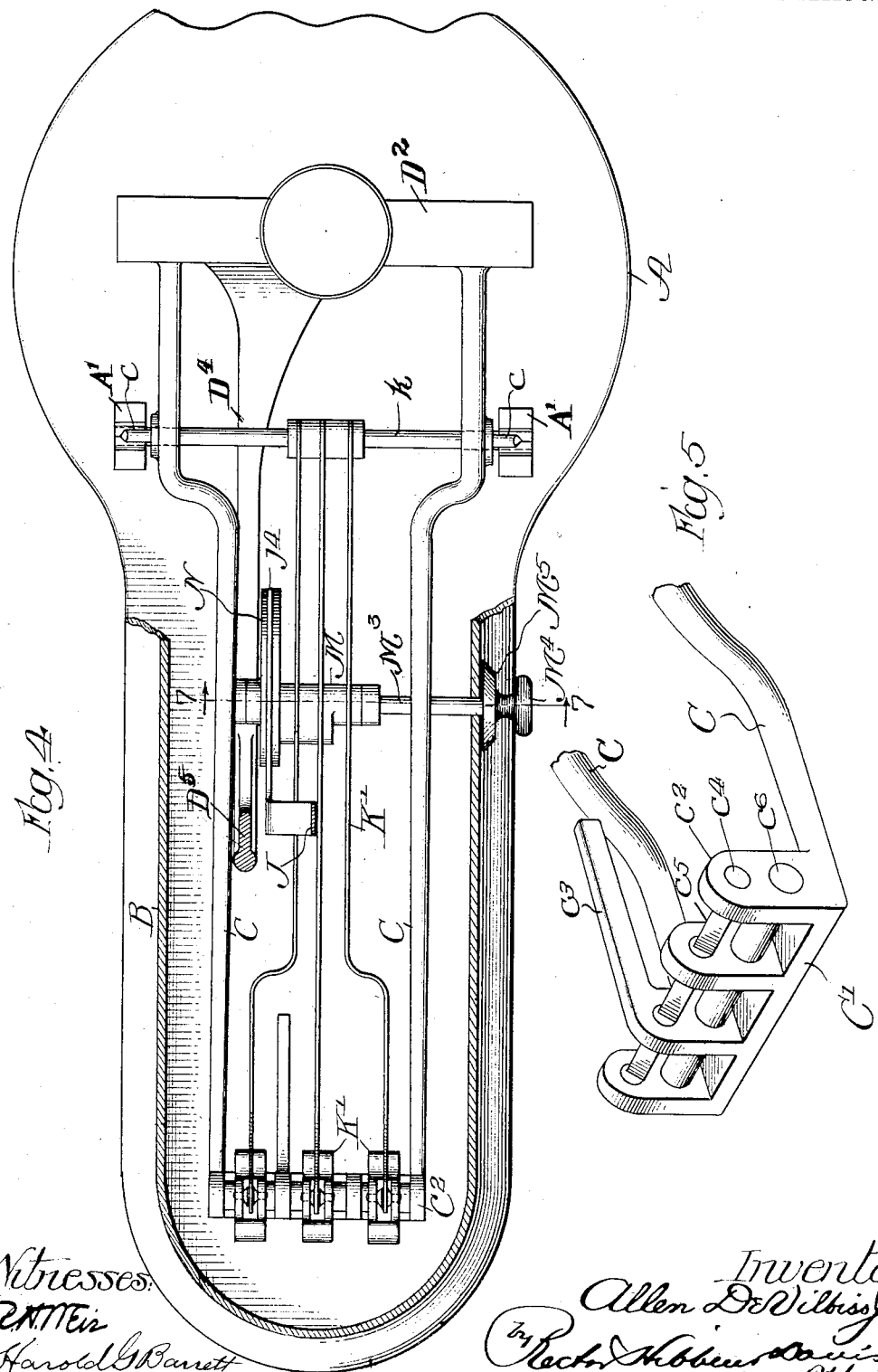

UNITED STATES PATENT OFFICE.

ALLEN DE VILBISS, JR., OF TOLEDO, OHIO, ASSIGNOR TO TOLEDO COMPUTING SCALE COMPANY, OF TOLEDO, OHIO, A CORPORATION OF NEW JERSEY.

WEIGHING-SCALE.

1,028,552.  Specification of Letters Patent.  Patented June 4, 1912.

Application filed November 26, 1909. Serial No. 529,925.

*To all whom it may concern:*

Be it known that I, ALLEN DE VILBISS, Jr., a citizen of the United States, residing at Toledo, in the county of Lucas and State of Ohio, have invented certain new and useful Improvements in Weighing-Scales, of which the following is a specification.

The chief purpose of the present invention is to provide an improved construction of weighing scales whereby a great range of weighing can be had without increasing the chart area or the movement of weighing parts, at the same time providing for the reading of the actual weight without the necessity of mental computation and also without condensing the graduations but on the contrary coarsening the same to make them more easily readable or subdivided to a great extent.

It is of course common to increase the capacity of weighing scales as by weighting the pendulum or applying one or more additional weights upon the beam and this has heretofore been done both automatically and by hand but I believe that heretofore increase in weighing capacity has necessarily meant either mental computing or condensed graduation. By the present invention it is provided that with the application of each weight to increase the capacity of the scales by some constant quantity the indication shall correspondingly advance. Thus with the chart or table normally displaying numerals indicating a range of weighing say zero to two pounds and graduations between such numerals, upon overbalancing the scale by say one pound or in other words opposing an additional pound to the weight of the goods, the indication changes to numerals running from two to four pounds, the numeral 2 taking the place of the 0 and numerals 3 and 4 taking the place of numerals 1 and 2. It will be obvious that an arrangement of this sort can be almost indefinitely varied as to the range of weighing. The normal weighing may be only up to one pound for instance and the range of weighing advanced one pound at a time instead of two pounds. Then of course the unit of the constant quantity represented by weight opposed to the load may vary and the number of weights to be so applied may vary.

In the drawings which accompany and form part of this specification Figure 1 represents in front elevation a pendulum-weighing scale embodying the invention, the inclosing casing appearing in section and the parts being at normal; Fig. 2 shows a sliding indicator detached, this indicator bearing the numerals which serve to show the range of weighing; Fig. 3 is a sectional view of means for depositing the auxiliary weights which represent constant quantities; Fig. 4 is a horizontal section taken substantially on the line 4—4 of Fig. 1; Fig. 5 is a perspective of the left-hand end of the main beam or lever; Fig. 6 shows the scale in end elevation with the casing in section; Fig. 7 is a section taken substantially on the line 7—7 of Fig. 4; Fig. 8 illustrates certain cams in elevation; Fig. 9 is a perspective view of one of the auxiliary weights; Fig. 10 is a fragmentary detail of a portion of such weight, together with a portion of the arm which normally holds it suspended; and Fig. 11 is a sectional detail of the same parts.

Referring first to Fig. 1 the letter A designates the base of the apparatus on which is mounted a suitable housing B to inclose the working parts. Within the lower part of this housing the main scale beam or lever is mounted, the same comprising side pieces C (Fig. 4) with knife edge trunnions $c$ resting in V-shaped bearings of standards A' rising from the base A. A spider D supporting the goods receiver D' (here shown as a platter, though of course it might be a scoop or other familiar form of goods receiver) has its boss extending into an opening of the housing and united with a cross bar $D^2$ having V-shaped bearings engaging knife edge trunnions $c'$ projecting from the beam side pieces C at the right-hand ends thereof. From the spider or the cross bar $D^2$ thereof depends a post $D^3$, to the lower end of which is secured a horizontal rod $D^4$ having rigidly fastened to its left-hand extremity a vertical bar $D^5$ running to the upper part of the housing. A link $D^6$ (dotted lines, Fig. 1) connects the upper end of said bar with a suitable part of the supporting framework. This is a familiar arrangement for keeping the platter or platform D' horizontal in vibration of the beam.

The left-hand ends of the beam side pieces C are united by a cross bar C' (Fig. 5) from which rise a series of ears $c^2$, one of which has a laterally projecting finger $c^3$. A stirrup E engages under this finger and is connected by a steel strap E' with an eccentric disk E², the latter secured to a pendulum journal or rock shaft E³. Knife edge trunnions e project from opposite ends of this journal or rock shaft and rest upon V-shaped bearings e' suitably mounted upon the supporting framework. A pendulum stem E⁴ is secured to and projects from said journal or rock shaft and carries a weight E⁵. The preponderating weight of the beam in its long arm to the left of its pivot or fulcrum is calculated to normally elevate the goods receiver and the pendulum as illustrated in Fig. 1. An index hand F is secured to the pendulum journal and projects upwardly over a plate G secured to the framework within the upper part of the housing B, this hand being here shown cut out in its left-hand edge at the upper end to provide pointers.

With the weighing arrangement above described the parts will be so proportioned or adjusted that in normal equilibrium the pendulum is elevated to a point where the hand F will indicate zero. A load placed upon the platform raises the long arm of the beam and the pendulum acts with the load but with diminishing effect so that equilibrium will be again arrived at with the hand indicating the weight of the load. Vibration of parts is reduced by the usual expedient of a dash-pot H applied to the beam.

Proceeding now to a description of means for carrying out the present invention (what has already been specified being in general old and well-known) the plate G instead of bearing one or more complete series of weight numerals and graduations has upon its face simply an arc-shaped series of graduation marks I with apertures $i$, $i'$ and $i^2$ at the two ends and the middle of such series of graduations. Behind the fixed plate G there is arranged a vertically-sliding indicator plate J, here shown as comprising an upright portion, a cross piece at the top and three upstanding portions $j$, $j'$ and $j^2$, each bearing a vertical series of numerals which may also be considered as comprising a horizontal series in curved lines corresponding with the curvature of the series of graduations I. This sliding indicator plate normally occupies its lowermost position, in which a zero at the top of the series of numerals on the part $j$ shows through the aperture $i$, the numeral 1 at the top of the series on the part $j'$ shows through the aperture $i'$ and the numeral 2 at the top of the series on the part $j^2$ shows through the aperture $i^2$, as illustrated in Fig. 1. It may be assumed therefore that normally the scale is adapted to weigh up to two pounds, the graduations of the left-hand half of the series I serving to denote ounces or other fractions of a pound (in the present instance half-ounces) up to one pound and the right-hand half of the series of graduations similarly denoting frictions between one and two pounds. It will be seen that, assuming the swing of the pendulum and of the index hand F to be the usual swing through approximately 60°, an area for weighing up to two pounds is provided equal to the area usually required to provide for weighing considerably higher, as for example to ten and twenty pounds. At the same time the scale of the present invention provides for weighing as high as may be desired, as will presently appear. Thus it will be seen that by lifting the plate J so as to carry the series 0, 1 and 2 above the apertures $i$, $i'$ and $i^2$ the numeral 2 may be caused to appear at the aperture $i$, the numeral 3 at the aperture $i'$ and the numeral 4 at the aperture $i^2$ and by further upward movement of said plate J the numeral 4 can be caused to appear at the aperture $i$, the numeral 5 at the aperture $i'$ and the numeral 6 at the aperture $i^2$, and then by still further upward movement of said plate J the numeral 6 can be caused to appear at the aperture $i$, the numeral 7 at the aperture $i'$ and the numeral 8 at the aperture $i^2$, and of course it will be understood that the vertical series of numerals on the parts $j$, $j'$ and $j^2$ may be extended to provide for further advance in the range of weighing. In any case it will be obvious that the graduations I serve to measure fractions of pounds in connection with the numerals appearing through the apertures and so the total weight can be read whether it is below or above the normal range of indications. In other words the chart or table may be said to be accumulative, advancing its range of indication while utilizing with each advance the same series of graduation marks.

The sliding indicator plate works in conjunction with means for applying an additional weight or weights to the left-hand end of the beam. Between the ears $c^2$ before mentioned there extends a bar $c^4$ having upwardly-directed knife edge formations $c^5$ between the ears, as clearly illustrated in Fig. 5. The auxiliary weights K are adapted to be deposited upon these knife edges, as illustrated in Fig. 3, each of such weights being cut out in the lower side to provide a V-shaped bearing and also a flaring opening. A rod $c^6$ extending through the ears $c^2$ serves as a guide to prevent displacement or shifting of the auxiliary weights when resting upon the knife edges, the sides of the flaring openings of the weights passing down on opposite sides of said rod, as illustrated in Fig. 3. The several weights K are of course normally suspended entirely free of the beam, as shown in Figs. 1 and 6. They are so suspended by a series of arms K' pivoted at their right-hand ends upon a cross rod $k$ extending between the uprights A'. Each of these arms has an upwardly-extending left-hand end portion with a hook $k^2$ at the extremity, in which hook engages the middle portion of a pin $k^3$ having flanges $k^4$ overlying opposite sides of the arm, as shown in Fig. 11. Oppositely projecting portions of the pin beyond these flanges engage in slots $k^5$ of the weight, the latter being bifurcated in its upper portion, as shown in Fig. 9. Normally the weights are suspended upon these pins $k^3$, as illustrated in Fig. 6, leaving the beam entirely free to vibrate up and down throughout the weighing within the normal range. The arms K' rest upon the high part of a cam piece comprising three sections M, M' and $M^2$. The low parts of these cam sections are graduated so as to provide for successively dropping the weights K upon the beam. This cam piece is secured to a shaft $M^3$ which is journaled in the framework and carries at the front a knob $M^4$ by which to turn it and an indicating head $M^5$ to register with a fixed pointer $m$ or suitable mark on the casing. Under the particular arrangement here shown this head bears the numerals 1, 2, 3 and 4, equally spaced apart and normally the numeral 1 registers with the pointer as shown in Fig. 1, the uniform high parts of the cam sections being uppermost and holding all of the arms K' elevated so as to leave the beam wholly unaffected by the weights K. The turning of the knob to bring the numeral 2 in registry with the pointer rotates the cam piece so as to bring the low part of the section M under the forward one of the arms K', thus permitting that arm to drop and deposit its weight upon the beam and the movement is sufficient to carry the pin $k^3$ below the upper ends of the slots $k^5$ in order to provide for full movement of the beam thus weighted with the weight wholly supported on the beam. Further turning of the knob to a position where the numeral 3 registers with the pointer continues the low part of the section M in contact with the section of the arms K' but brings the low part of the section M' under the second arm, thus permitting that arm to lower and deposit its weight upon the beam as shown in Fig. 3. And so with the further turning of the knob to bring the numeral 4 is register with the pointer the low part of the remaining cam section $M^2$ is brought under the remaining arm K', permitting that arm to lower and deposit its weight upon the beam. It will be noted by reference to Fig. 8 that the high portions of the cam section M' is more extensive than the high portion of the section M and the high portion of the section $M^2$ is more extensive than that of the section M'. Correspondingly, the low part of the section M is more extensive than that of the section M' and the low part of the latter section more extensive than that of the section $M^2$.

On the same shaft $M^3$ to which the cam piece is secured there is fastened another cam N with a grooved periphery and an outline as shown in Fig. 1 and this cam serves to shift the sliding index plate J to correspond with the deposit of weights upon the beam. At the lower end of the plate J there is a laterally-extending portion $j^4$ which bears upon the cam N in the peripheral groove thereof, as illustrated in Figs. 1 and 7. The plate rests by gravity upon the cam and normally upon a flat low part thereof, as illustrated in Fig. 1. When the knob $M^4$ is turned the cam N of course turns with it and the plate J will be elevated according to the extent of turning of the knob $M^4$. The outline of the cam is such that in turning the knob from the 1 to the 2 position the plate is elevated an extent just sufficient to disclose through the openings $i$, $i'$ and $i^2$ the numerals 2, 3 and 4. Further turning of the knob from the 2 to the 3 position elevates the sliding indicator plate far enough to exhibit the numerals 4, 5 and 6 through said openings. Still further turning of the knob from the 3 to 4 position brings to view the numerals 6, 7 and 8. It is thus obvious that with each turning of the knob to deposit a weight upon the beam the range of weighing indications is correspondingly advanced.

It is obvious that the indicating arrangement may be duplicated so as to provide for reading the correct weight on either side of the scale. In Fig. 6 the indicating hand is shown double, the rear member being designated F', and it will further be noted that two fixed plates are shown, the rear one being designated G'. This plate will bear the same series of graduations as the front plate and will be correspondingly apertured for the display of numerals on the rear side of the plate J, the several series of numerals as they appear in Fig. 2 being duplicated on the opposite sides of the portions $j$, $j'$ and $j^2$ of the plate.

It will now be seen that the construction above described is well calculated to thoroughly accomplish the object primarily stated. At the same time it is to be understood that this construction is susceptible of considerable modification within the scope of the invention.

What is claimed is:

1. In weighing scales, the combination of a main beam, a goods receiver thereon, indicating means including a fixed weight chart, means for overbalancing the scales in predetermined degree, means for advancing the range of indication of the weight chart to correspond, and manually controlled operating means common to both said means.

2. In weighing scales, the combination of a main beam, an index operated thereby, a goods receiver thereon, a fixed chart bearing variable weight indications with which the index coöperates, means for altering the counterbalancing effect of the scale, means for correspondingly varying the weight indications of the chart, and an operating device common to the two said means for operating them simultaneously.

3. In weighing scales, the combination of a main beam, a goods receiver thereon, a pendulum operatively connected with the beam, an index connected to the pendulum, a chart having weight graduations, one or more weights for application to the beam, an indicator to denote the range of weighing by said graduations, means for depositing the weight or weights on the beam, and means for simultaneously shifting said indicator, said two means being operatively connected.

4. In weighing scales, the combination of a main beam, a goods receiver thereon, a pendulum operatively connected with the beam, an index connected to the pendulum, a fixed plate bearing a series of weight graduations and apertured at the ends of the series of graduations, one or more normally suspended weights for application to the beam, a movable indicator extending behind the plate and adapted to show through the apertures thereof, means for depositing the weight or weights on the beam, and means for simultaneously shifting said indicator, said two means being operatively connected.

5. In weighing scales the combination of a main beam, a goods receiver thereon, a pendulum operatively connected with the beam, an index connected to the pendulum, a fixed plate bearing a series of weight graduations and apertured at the ends of the series of graduations, one or more normally suspended weights for application to the beam, a movable indicator extending behind the said plate and adapted to show through the apertures thereof, cams for depositing the weight or weights on the beam and correspondingly shifting said indicator and means for shifting the cams.

6. In weighing scales, the combination of a main beam, a goods receiver thereon, a pendulum operatively connected with the beam, an index connected to the pendulum, a fixed plate bearing a series of weight graduations and apertured at the ends of the series of graduations, one or more normally suspended weights for application to the beam, a sliding plate behind the fixed plate bearing weight indicia to show through the apertures of said fixed plate, means for depositing the weight or weights on the beam, and means for simultaneously shifting said sliding plate, said two means being operatively connected.

7. In weighing scales, the combination of a main beam, a goods receiver thereon, a pendulum operatively connected with the beam, an index connected to the pendulum, a fixed plate bearing a series of weight graduations and apertured at the ends of the series of graduations, one or more normally suspended weights for application to the beam, a sliding plate behind the fixed plate and bearing a plurality of series of weight numerals to show in sets through the apertures of the said fixed plate, and a cam on which said sliding plate rests, means for depositing the weight or weights on the beam and means for simultaneously operating the cam, said weight depositing means and cam operating means being operatively connected.

8. In weighing scales the combination of a main beam, a goods receiver thereon, a pendulum operatively connected with the beam, an index connected to the pendulum, a fixed plate bearing a series of weight graduations and apertured at the ends of the series of graduations, one or more pivoted arms, one or more weights normally suspended on said arms respectively, cams supporting the arms and adapted to be turned to deposit the weights on the beam, a sliding indicator plate behind the aforesaid fixed plate and bearing weight numerals to show through the apertures of the same, and a cam supporting said sliding plate and turning with the first-mentioned cams and means for actuating the cams.

9. In a weighing machine, the combination with weighing mechanism having a graduated index scale, and a pointer movable over the scale, of a revoluble dial, means adapted to be operated by the dial to progressively increase or decrease, as indicated by the dial, the weighing capacity of the mechanism, and means adapted to be operated by the dial simultaneously with the means for changing the weighing capacity to change the numerals of the index scale designating the units of weight thereof, according to the increase or decrease of the weighing capacity of the mechanism.

10. In a weighing machine, the combination with a weighing mechanism having a movable index, of a graduated scale for the movable index, said scale having display openings in lieu of numerals or marks designating units of weight, movable display means behind the index scale, said display means having thereon a plurality of series of progressive numerals, the numerals of each series being adapted to be simultaneously brought into or out of register with the display openings of the index scale by a movement of the display means, and each of said series of numerals being respectively adapted when registered with the openings of said scale to give a distinct and different range of capacity to the scale from any other series, a revoluble dial, means adapted to be operated by revolving the dial, and thereby to effect, according to the movement of the dial, movement of the display means to consecutively register with the scale openings each one of said series of numerals, and means adapted to be operated by the dial simultaneously with the registering of each series to change the range of capacity of the weighing mechanism to correspond with the then registered capacity of the scale.

11. In a weighing machine, the combination with a weighing mechanism, comprising a fulcrumed lever having a long arm provided with a series of weight bearings, a short arm provided with a receiver for material to be weighed, a pendulum connected to and normally held by the long arm with its center of gravity at the highest point in its path of travel, and an index adapted to be moved through an arc by the pendulum, of a plate beside the index said plate having a graduated scale for the arc of travel of the index, and having openings in lieu of graduations designating the units of weight of the scale, an indicating plate movable behind the scale plate, and having a plurality of numerals for each opening of the scale, arranged in a plurality of cross series adapted to designate on the scale the units of weight of different ranges of capacity of the weighing mechanism, and adapted to be consecutively registered with the openings of the scale by the indicating plate, a series of weights, one for each weight bearing of the long arm of the lever, a weight arm for each weight, adapted when raised to suspend the weight free of its bearing and when lowered to deposit the weight thereon, and thereby change the range of weighing capacity of the lever, a rotatable cam shaft beneath the weight arms, a series of cams on the cam shaft, one for each weight arm and one for the indicating plate, said cams being in fixed relation to each other on the shaft, and adapted to consecutively lower or raise the weight arms and thereby consecutively increase or decrease the weighing capacity of the lever, and simultaneously to the lowering or raising of a weight arm to move the indicating plate, to register with the openings in the scale plate, the series of numerals corresponding to the capacity of numerals established by the lowering or raising of each weight, and means to manually rotate the cam shaft.

ALLEN DE VILBISS, Jr.

Witnesses:
ARTHUR STULL,
E. J. SHEFFER.